United States Patent [19]
Ogren et al.

[11] 3,992,685
[45] Nov. 16, 1976

[54] CHEMICAL LASER PUMP

[75] Inventors: John R. Ogren, La Palma; Eugene V. Rutkowski, Palos Verdes; Marvin Appel, Redondo Beach, all of Calif.

[73] Assignee: TRW Systems & Energy, Redondo Beach, Calif.

[22] Filed: Mar. 18, 1976

[21] Appl. No.: 668,169

Related U.S. Application Data

[63] Continuation of Ser. No. 286,242, Sept. 5, 1972, abandoned.

[52] U.S. Cl.......................... 331/94.5 G; 23/252 R; 330/4.3; 23/284; 313/174; 252/181.6; 331/94.5 T
[51] Int. Cl.² .......................................... H01S 3/095
[58] Field of Search ................... 331/94.5 T, 94.5 S, 331/94.5 G; 315/108, 110; 313/174, 176, 181; 417/48; 316/25; 252/181.6; 55/16, 74; 23/252 B, 252 R, 284

[56] References Cited
UNITED STATES PATENTS

| | | | |
|---|---|---|---|
| 2,799,159 | 7/1957 | Sabol | 23/284 |
| 3,605,036 | 9/1971 | Barnaby | 313/174 |
| 3,621,330 | 11/1971 | Miller | 315/110 |
| 3,641,455 | 2/1972 | Matovich | 315/108 |
| 3,688,215 | 8/1972 | Spencer et al. | 331/94.5 PE |
| 3,893,045 | 7/1975 | Jacobson et al. | 331/94 JG |

FOREIGN PATENTS OR APPLICATIONS

| | | | |
|---|---|---|---|
| 2,161,348 | 11/1973 | France | |
| 1,256,398 | 12/1971 | United Kingdom | 331/94.5 G |

*Primary Examiner*—Nelson Moskowitz
*Attorney, Agent, or Firm*—Daniel T. Anderson; Willie Krawitz; Alan D. Akers

[57] ABSTRACT

A chemical laser including a laser pump which is relativey lightweight with no moving parts is provided. This produces a low pressure, regenerable, closed system for treating laser cavity exhaust gases to remove (i.e., pump) them from the system.

The exhaust gases which emerge from the laser cavity of the chemical laser are pumped by reacting them preferably with titanium, titanium-zirconium alloys, zirconium, tantalum, etc. These gases include hydrogen, deuterium and their halides, the halogens, oxygen, $CO_2$, nitrogen and $H_2O$. This obviates the requirements for heavy equipment normally employed to produce a high vacuum in the laser cavity.

10 Claims, 7 Drawing Figures

CHEMICAL LASER PUMP

This is a continuation of application Ser. No. 286,242, filed Sept. 5, 1972, now abandoned.

BACKGROUND OF THE INVENTION

This invention relates to a chemical laser and, more specifically, to a chemical laser pump adapted to quickly remove exhaust gases from the laser cavity.

Chemical lasers typically involve a reaction such as hydrogen and/or deuterium with fluorine, chlorine, bromine or iodine with diluent gases of $N_2$, He, etc., to produce hydrogen and deuterium halides. The laser action takes place at pressures of about 15 torr and below using halides such as HF and/or DF molecules in the excited vibrational states. Decay to ground level of these excited HF and DF molecules produces a lasing action with an output spectrum varying from about 3.6–4.0 microns for DF and 2.6–2.9 microns for HF.

Not only must population inversion requirements be met, but high temperature and low pressure requirements must also be maintained for lasing action to be sustained. Additionally, exhaust gases at ground level state must be removed very quickly from the laser cavity otherwise they will quench the lasing action. These exhaust gases are at temperatures as high as 3000° K.

It will be appreciated that at low altitudes it is impossible to naturally vent these low pressure gases into the atmosphere. Hence, the usual practice is to pump the exhaust gases along with the carrier gases such as nitrogen or helium from the laser cavity into the atmosphere. Pumping requirements are attained using large capacity mechanical, ejector, or turbo mechanical pumps; however, this mode of operation presents several difficulties. To begin with, pumping hydrogen and deuterium halides into the atmosphere causes a pollution problem. Also, the large weight of the pumps can preclude employment of a chemical laser in an aircraft where weight is important.

It is, therefore, an object of this invention to provide a chemical laser provided with a pump suitable for removing high energy, low pressure exhaust gases from the laser cavity.

Another object is to provide a process for removing exhaust gases from the laser cavity of a chemical laser without the necessity of discharging these gases into the surrounding atmosphere.

Another object is to provide a pump for a chemical laser which is smaller and lighter than conventional large capacity mechanical pumps.

Another object is to provide a pump for a chemical laser, the pump having no moving parts and which provides complete containment of the exhaust gases from the laser cavity.

Other objects of the invention will become apparent from the description and diagrams to follow in which.

According to the invention, there is provided a chemical laser including a laser pump for removing low pressure exhaust gases from the laser cavity, the pump including a reactive metal selected from the class consisting of titanium, zirconium, hafnium, vanadium, niobium, tantalum, yttrium, scandium, elements 57–71 of the periodic table, mixtures and alloys thereof, the exhaust gases being selected from the class consisting of hydrogen and deuterium, the halides thereof, the halogens, nitrogen, $CO_2$, oxygen and water vapor.

Other elements, their alloys and mixtures which may also be employed include lithium, sodium, potassium, rubidium, cesium, beryllium, magnesium, strontium, calcium, barium, boron, gallium, and palladium.

Preferred reactant metals are exemplified by titanium, zirconium and titanium-zirconium alloys; these metals will react with the exhaust gases to form solid reaction products. The reactant metal may be in the form of powder, sponge, foil, etc.; however, the powdered form, because of its high surface area, is preferred.

Typical examples of titanium reaction with hydrogen, nitrogen, and oxygen are as follows:

1. $H_2$ (gas) + Ti (solid) → TiHx (solid) $0 = x < 2$
2. $N_2$ (gas) + 2Ti (solid) → 2TiN (solid)
3. $O_2$ (gas) + Ti (solid) → $TiO_2$ (solid)

Deuterium acts in a similar fashion as hydrogen, and both may be regenerated by heating the corresponding titanium compound.

The halides of hydrogen and deuterium react with titanium as follows:

4. 6HF (gas) + 5Ti (solid) → $2TiF_3$ (solid) + $3H_2$ (gas)

Followed by:

5. $H_2$ (gas) + Ti (solid) → TiHx (solid) $0 < x < 2$

Water vapor reacts in an analogous two-step manner.

6. $2H_2O$ (gas) + Ti (solid) → $TiO_2$ (solid) + $2H_2$ (gas)
7. $H_2$ (gas) + Ti (solid) → TiHx (solid) $0 < x < 2$

EXAMPLE 1

Figure 1:
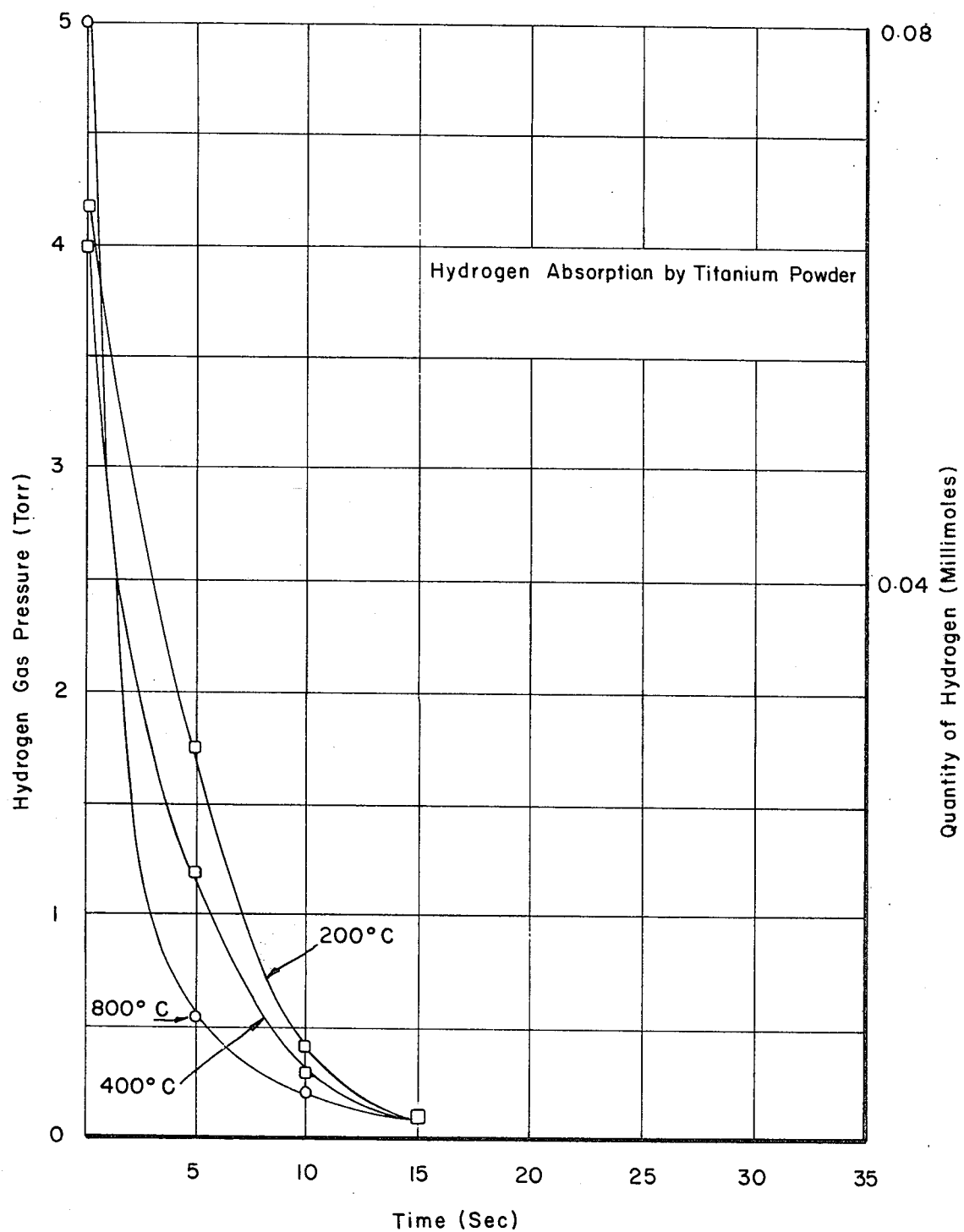
FIGS. 1–5 are graphs showing the relation between gas absorbtion and pumping or gas removal rate.
Figure 2:
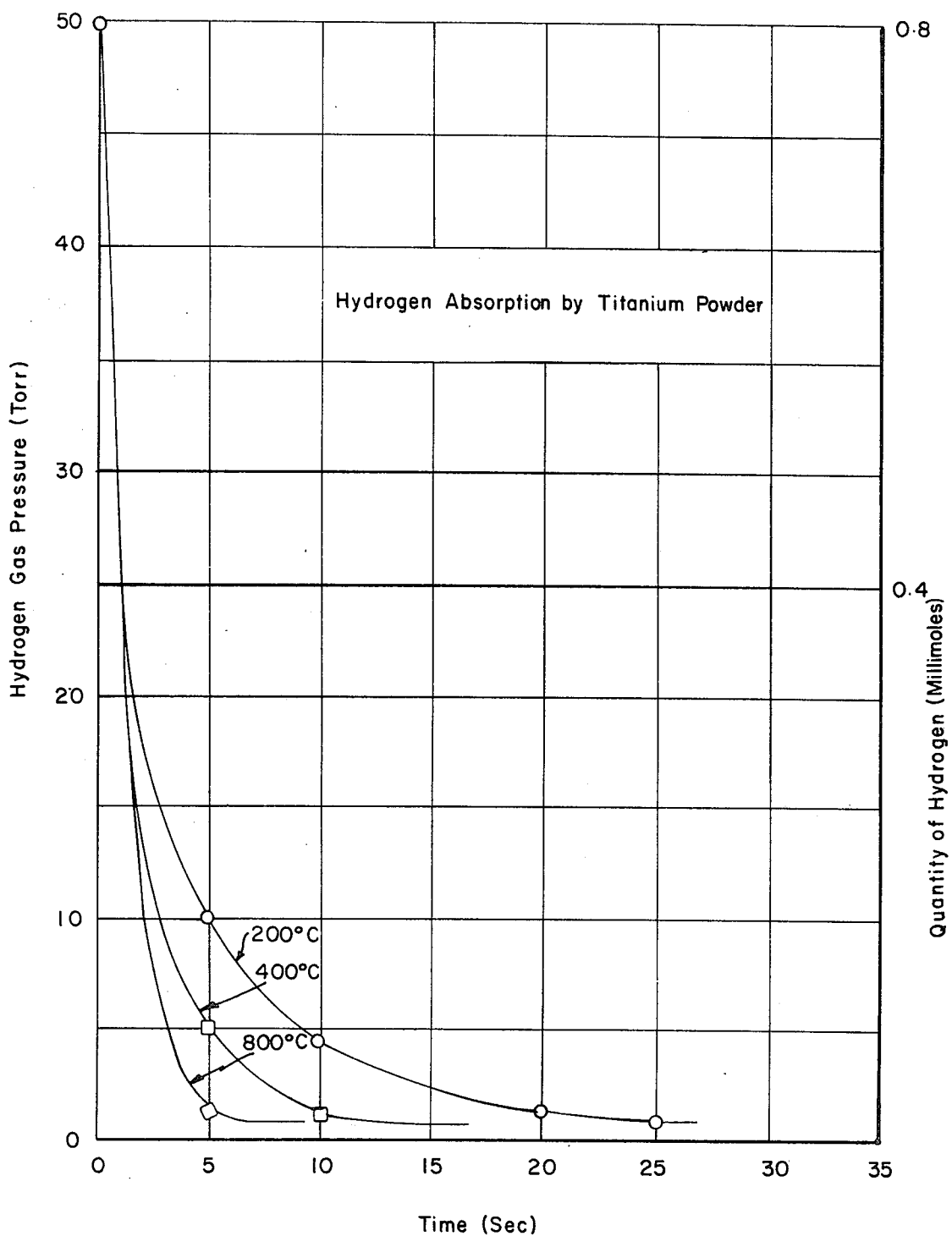

Hydrogen gas at 5 torr pressure was exposed to 1.1844 grams of titanium powder (1030 cm² surface area) in a constant volume reaction chamber. Pressure decrease signified gas removal. FIG. 1 shows the pressure decrease at various temperature levels in the 200°–800° C range at pressures up to 5 torr. FIG. 2 shows the extent of pressure decreases in the temperature range of 200°–800° C and at pressures up to 50 torr. It will be observed that in both cases, a pressure reduction below 10 torr was achieved in less than 10 seconds; this is a sufficiently low pressure for lasing action to occur.

EXAMPLE 2

Hydrogen gas at pressures of 0–7 torr was removed under varying temperature conditions with titanium and with titanium dihydride that had been decomposed under a hard vacuum at 710° C. The data are summarized in Table 1, which follows.

TABLE 1

CHEMICAL PUMPING OF HYDROGEN BY REACTION WITH TITANIUM
(Hydrogen Gas Pressures 0–7 Torr)

| STARTING MATERIAL | PRETREATMENT Temperature (°C) | Time (Minute) | Environment | Temperature (°C) | HYDROGEN PUMPING RATE DATA Initial Rate $10^{-6}$ moles/gm.sec | Final Rate $10^{-6}$ moles/gm.sec | Final Composition |
|---|---|---|---|---|---|---|---|
| Titanium Dihydride | 710 | 10 | Hard Vacuum | 400 | 55 | 20 | $TiH_{1.2}$ |
| Titanium Dihydride | 700 | 120 | Mechanical pump only | 410 | 0.2 | 0.2 | $TiH_{0.2}$ |
| Titanium | 850 | 20 | Hard vacuum[1] | 416 | 16 | 7.8 | $TiH_{0.2}$ |
| Titanium | 710 | 20 | Mechanical[2] pump only | 410 | 19 | 4.2 | $TiH_{0.08}$ |
| Titanium | None | None | Mechanical pump only | 410 | 1.6 | | |
| | | | Raise temperature in presence of $H_2$ | 500 | 88 | 50 | $TiH_{0.2}$ |

[1]Pressure was below 1 micron before $H_2$ was introduced.
[2]Residual gas pressure was about 15 microns when $H_2$ was introduced.

It will be seen from the data that in the case of titanium dihydride, an initial pretreatment of 710° C for 10 minutes in a hard vacuum resulted in a reaction rate with hydrogen of 55 micromoles of hydrogen per second per gram of titanium dihydride. As the reaction proceeded to the final composition of $TiH_{1.2}$, the reaction rate with hydrogen at 450° C was still $$\frac{20 \times 10^{-6} \text{ moles.}}{\text{gm.sec}}$$

The data of Table 1 also show that untreated pure titanium in a vacuum reacted rather slowly with hydrogen at 410° C. However, when the temperature of the untreated titanium was raised to 500° C, the reaction proceeded rapidly (88 micromoles $H_2$/gm.sec) and continued to be rapid even after a substantial amount of hydrogen had reacted.

Figure 3:
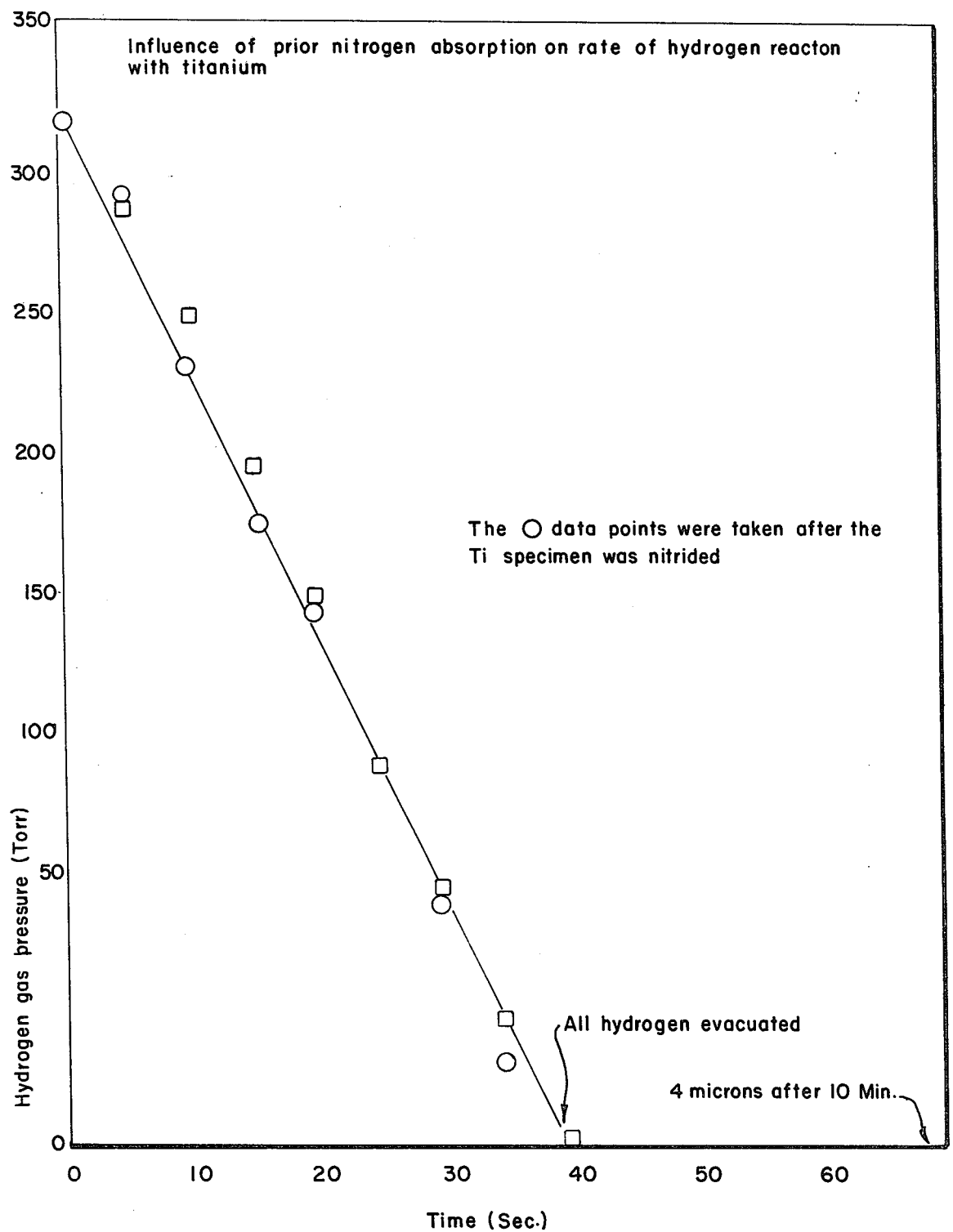

Furthermore, the presence of nitrogen as a carrier gas had no effect on the reaction rate of titanium with hydrogen after an initial hard vacuum pretreatment even when the nitrogen gas was present to the extent of about 0.1 millimoles, as shown in FIG. 3.

Thus a prior absorption of 2.0474 grams "CERAC" titanium (−150 to +325 mesh having an area of 560 cm²/g) with nitrogen at 400° C showed no measurable difference in hydrogen removal; this is shown in the graph of FIG. 3. The pumping rate was $$\frac{13.05 \times 10^{-8} \text{ moles } H_2.}{\text{cm}^2\text{.sec}}$$

EXAMPLE 3

Figure 4:
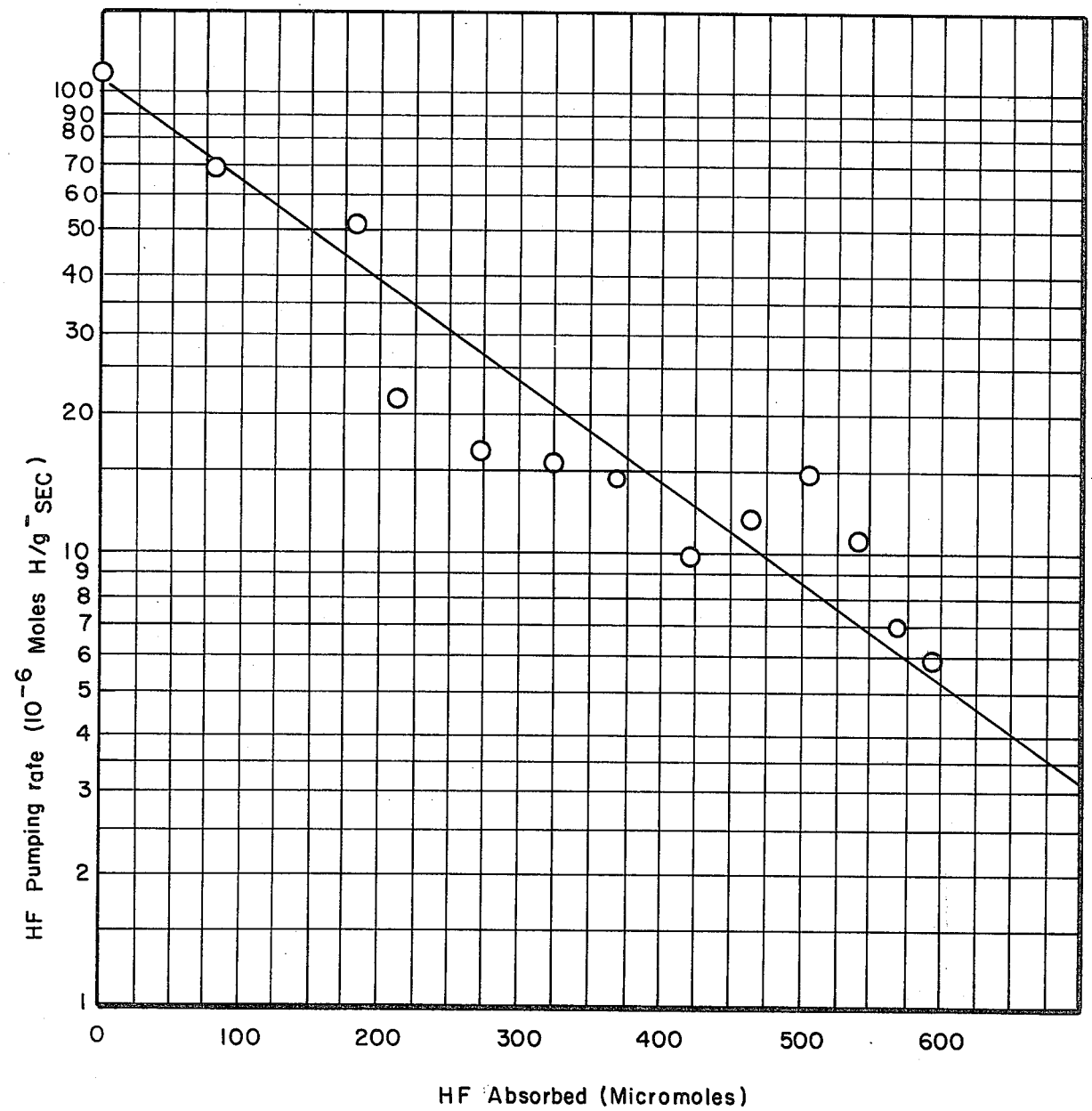

Titanium dihydride was decomposed by heating at 800° C for 30 minutes in a hard vacuum. 1.0988 grams of the decomposed titanium dihydride having an area of 2500 cm² was employed to react with hydrogen fluoride at 510° C and a pressure of 0–25 torr. The results are shown in the graph of FIG. 4. The reaction rates are for the complete removal of all gas from the constant volume reaction chamber and thus represent the combined reaction mechanisms shown in equations 4 and 5 (supra). From the graph, it will be observed that both hydrogen and fluorine are absorbed continuously with no abrupt cessation in reactivity.

EXAMPLE 4

Figure 5:
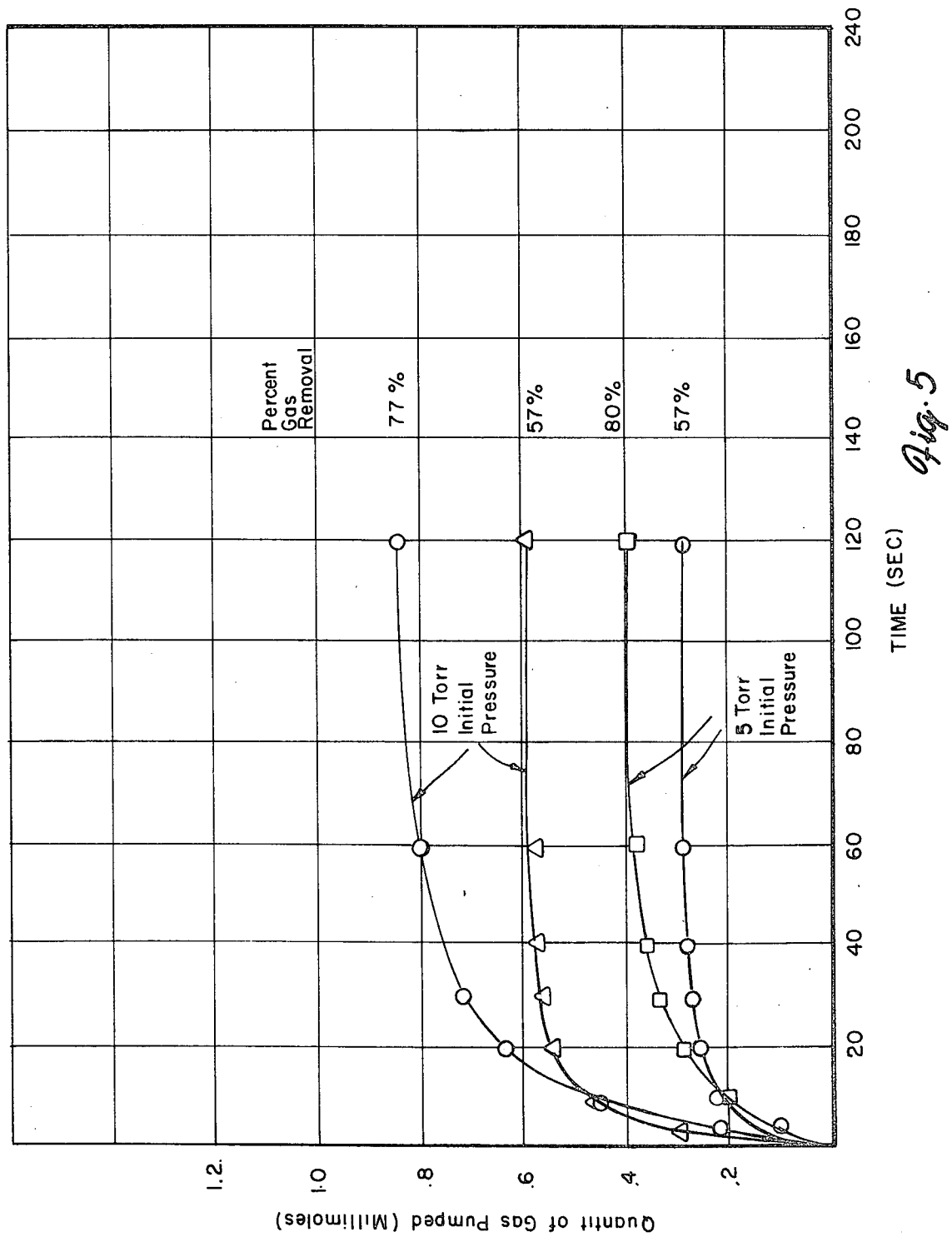

A constant volume twin chamber was employed to remove a mixture of nitrogen, hydrogen fluoride and hydrogen from a laser cavity. One gram of titanium dihydride which had been decomposed at 800° C in a 15 micron vacuum was maintained at 850° C in the first chamber. In the second chamber, another 1 gram charge of similarly treated titanium dihydride was maintained at 400° C. A mixture of nitrogen, hydrogen fluoride and hydrogen was admitted to both chambers and the rate of total gas removal was monitored by pressure measurement. This involved two runs at 10 torr initial pressure and two runs at 5 torr initial pressure. The results are shown in the graph of FIG. 5 which indicates that the amount of exhaust gas removal depended primarily on the pressure after the first 30 to 40 seconds.

Figure 6:
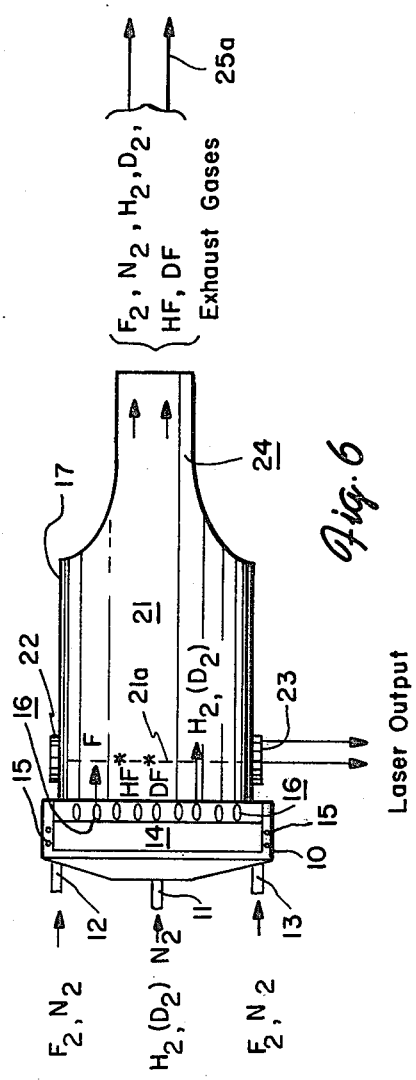
FIG. 6 is a schematic sectional side elevation of a chemical laser suitable for use in the present invention.

In operation, a chemical laser is shown schematically in FIG. 6 and comprises a combustor 10 having inlet ports 11, 12 and 13 for the reactants hydrogen, deuterium, and for a halogen such as fluorine. The reactants can also be any $H_2$ and/or $D_2$ containing substance capable of forming $H_2$ and/or $D_2$ and any halide containing substance capable of reacting to produce free halogen atoms. Diluents such as nitrogen, helium, etc., may be injected with or into the reactants through separate inlet ports in either the combustor or into the laser cavity. In the combustor, there is generated a gaseous mixture of halogen atoms and molecules such as F and $F_2$. Water cooling coils 15 are disposed about the outer periphery of the combustor 10; however, the cooling coils may be eliminated depending upon the combustor design. Cavity injection nozzles 16 are provided for F atoms and $F_2$ molecules in the excited state to exit from the combustor and combine with $H_2$, $D_2$ or substances containing $H_2$ and/or $D_2$ to generate vibrationally excited HF* and DF* molecules. An exhaust manifold 17 is mounted centrally and axially of the combustor 10, and defines a laser cavity 21 immediately adjacent the outlet ports 16. Lasing action occurs along a lasing axis 21a transverse to the gas flow.

Rear mirror 22 and output mirror 23 are provided on opposite sides of the cavity 21 for amplifying and emitting laser radiation produced in the cavity due to HF* and DF* decay.

Rear mirror 22 and output mirror 23 comprise 4 inches × 4 inches square, spherically concave-ground mirrors with a 118 inch radius of curvature and having a 30 inch separation. The outut mirror 23 was an optical flat with a transmittance of about 10%. The rear mirror 22 had a reflectance of about 98%.

For lasing operation, $D_2$ and/or $H_2$ in a nitrogen diluent gas are pumped into the combustor 10 along with $F_2$ at a temperature of about 1500°–3000° C which then forms F and $F_2$, the reaction being hypergolic. A pressure range of 8–50 psi in the combustor is typical. The gases then flow through the outlet ports 16 into the laser cavity 21 where HF* and/or DF* are formed and lasing occurs. Pressures in the laser cavity are maintained at about 1–10 torr which is suitable for lasing action. Static temperatures of the supersonic flow in the laser cavity may vary from about 200°–900° C.

Generally, exhaust gases emerging from the laser cavity such as $H_2$, $D_2$, HF, $N_2$, $O_2$, $CO_2$ and $H_2O$ are passed along the exhaust manifold through a constricted portion 24 which functions as a venturi or diffuser and permits pressure recovery further downstream. The exhaust gases may then be pumped by a chemical reaction such as with titanium, as in Examples 1–4, or a combination of condensation (to remove HF and/or DF), chemical reaction (to remove $H_2$ and $D_2$) and cryogenic adsorption to remove nitrogen.

Figure 7:
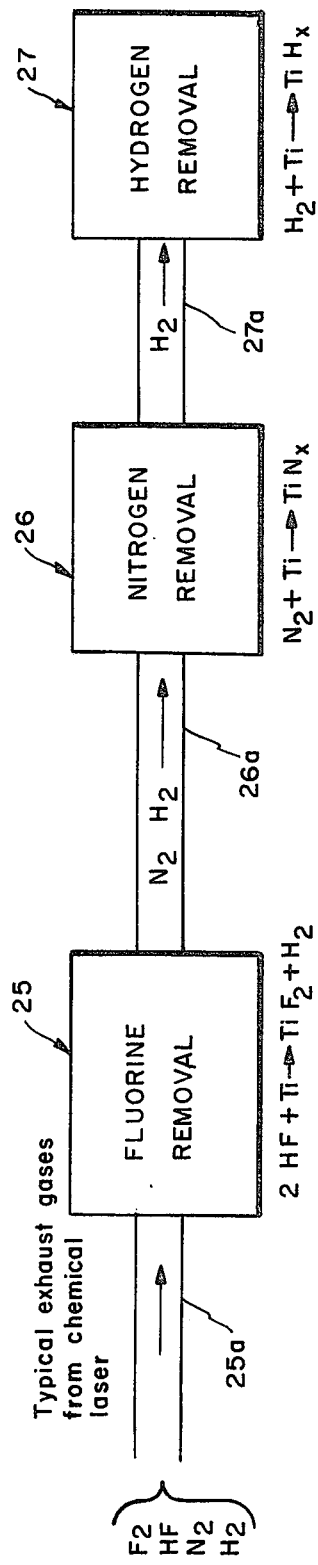
FIG. 7 is a schematic of the reactor vessels employing the chemical pump of this invention.

More specifically, in accordance with the present invention, pumping of the exhaust gases by chemical reaction can be effected as shown in FIG. 7; this comprises a plurality of reactors 25, 26 and 27 containing heated titanium, maintained at different temperatures. The reactors are connected to the exhaust manifold of the laser and to each other by conduits 25a, 26a and 27a and receive the exhaust gases such as HF, DF, $F_2$, $H_2$, $D_2$, and $N_2$ from the laser cavity. It will be observed that in reactor 25, HF, DF and $F_2$ are first reacted with the titanium to produce $TiF_2$. Hydrogen removed from the HF reaction, unreacted $H_2$, deuterium from the DF reaction, unreacted $D_2$ and nitrogen are forwarded to reactors 26 and 27 for subsequent reaction with the heated titanium to form titanium hydride and titanium nitride compounds.

Alternately, the nitrogen can be removed from the exhaust gases by first pre-cooling (to condense HF and DF) after which the nitrogen is adsorbed in a liquid nitrogen-cooled molecular sieve rather than reacted with the titanium. A suitable molecular sieve is sold by the Linde Division of Union Carbide as Linde 5A. This is an A type sieve having a pore size diameter of about 5A.

A chemical pump of the present invention weighing about 100 pounds can pump the same total laser flow as would require over 1000 pounds of pumping weight using a mechanical pump and scrubber system to produce a similar laser pumping and halide removal.

This arrangement can thus remove exhaust gases from the system employing a chemical reaction rather than a mechanical pump. If avoiding pollution is the sole requirement, removal from the effluent of halides, halogens and other undesirable compounds is sufficient. The remaining diluents such as nitrogen and hydrogen may be pumped and vented by other means. For a completely closed system, all the gases are reacted, adsorbed or condensed.

It will be appreciated that the chemical pump of the present invention is not restricted in its operation to chemical lasers having a combustion chamber but can function in conjunction with chemical lasers in general.

Finally, the present laser system permits recycling of the exhaust gases. This in turn reduces the costs of fresh feed gas and also lessens the chance of contaminating the reactant gases from an external source.

We claim:

1. A chemical laser including a laser cavity, an exhaust, and a pump for removing exhaust gases from the laser cavity at supersonic speeds and sufficient low pressure to sustain lasting action in a closed system:
   the pump consisting of a powdered metal selected from the class consisting of titanium, zirconiun, hafnium, vanadium, niobium, tantalum, yttrium, scandium, elements 57–71 of the periodic table, lithium, sodium, potassium, rubidium, cesium, beryllium, palladium, magnesium, strontium, calcium, barium, boron, gallium and mixtures and alloys thereof,
   the exhaust gases being selected from the class consisting of hydrogen, deuterium and their halides, the halogens, nitrogen, $CO_2$, oxygen and water vapor;
   the metal of said pump being adapted to react with the exhaust gases to form solid reaction products therewith.

2. The chemical laser of claim 1 in which the pump comprises a reactor.

3. A chemical laser including a laser cavity, an exhaust, and a pump for removing exhaust gases from the laser cavity at supersonic speeds and sufficient low pressure to sustain lasting action in a closed system:
   the pump consisting of a powdered metal selected from the class consisting of titanium, zirconium and mixtures and alloys thereof,
   the exhaust gases selected from the class consisting of hydrogen, deuterium and their halides, the halogens, nitrogen, $CO_2$, oxygen and water vapor;
   the metal of said pump being adapted to react with the exhaust gases to form solid reaction products therewith.

4. The chemical laser of claim 3 in which the pump comprises a reactor.

5. A process for operating a chemical laser comprising:
   transmitting lasting reactants in a carrier gas into a combustor;
   combining the reactants in the combustor to form atoms in the excited state in sufficient amount to cause population inversion;
   passing the excited atoms into a laser cavity at supersonic speeds to produce lasing action; and
   pumping exhaust gases from the laser cavity at supersonic speeds and sufficient low pressure to sustain lasing action by reaction with a powdered metal selected from the class consisting of calcium, titanium, zirconium and mixtures and alloys thereof,
   the exhaust gases selected from the class consisting of hydrogen, deuterium and their halides, the halogens, nitrogen, $CO_2$, oxygen and water vapor;
   the metal of said pump being adapted to react with the exhaust gases to form solid reaction products therewith.

6. A process for pumping a chemical laser at supersonic speeds and sufficient low pressure to sustain lasing action in a closed system, comprising:
   reacting cavity exhaust gases with a powdered metal selected from the class consisting of titanium, zirconium, hafnium, vanadium, niobium, tantalum, yttrium, scandium, elements 57–71 of the periodic table, lithium, sodium, potassium, rubidium, cesium, beryllium, palladium, magnesium, strontium, calcium, barium, boron, gallium and mixtures and alloys thereof, the exhaust gases being selected from the class consisting of hydrogen, deuterium and their halides, the halogens, nitrogen, $CO_2$, oxygen and water vapor;

the metal of said pump being adapted to react with the exhaust gases to form solid reaction products therewith.

7. A process for pumping a chemical laser at supersonic speeds and sufficient low pressure to sustain lasing action in a closed system, comprising:

reacting cavity exhaust gases with a powdered metal selected from the class consisting of calcium, titanium, zirconium and mixtures and alloys thereof, the exhaust gases selected from the class consisting of hydrogen, deuterium and their halides, the halogens, nitrogen, $CO_2$, oxygen and water vapor;

the metal of said pump being adapted to react with the exhaust gases to form solid reaction products therewith.

8. A process for operating a combustion chemical laser comprising:

transmitting lasing reactants in a carrier gas into a combustor;

combining the reactants in the combustor to form atoms in the excited state in sufficient amount to cause population inversion;

passing the excited atoms into a laser cavity at supersonic speeds to produce lasing action; and pumping exhaust gases from the laser cavity at supersonic speeds and sufficient low pressure to sustain lasing action by reaction with a powdered metal selected from the class consisting of titanium, zirconium, hafnium, vanadium, niobium, tantalum, yttrium, scandium, elements 57–71 of the periodic table, lithium, sodium, potassium, rubidium, cesium, beryllium, palladium, magnesium, strontium, calcium, barium, boron, gallium, and mixtures and alloys thereof, the exhaust gases being selected from the class consisting of hydrogen, deuterium and their halides, the halogens, nitrogen, $CO_2$, oxygen and water vapor;

the metal of said pump being adapted to react with the exhaust gases to form solid reaction products therewith.

9. The chemical laser of claim 1 in which the pump comprises a reactor.

10. The chemical laser of claim 3 in which the pump comprises a reactor.

* * * * *

UNITED STATES PATENT OFFICE
CERTIFICATE OF CORRECTION

Patent No. 3,992,685              Dated November 16, 1976

Inventor(s) John R. Ogren et al.

It is certified that error appears in the above-identified patent and that said Letters Patent are hereby corrected as shown below:

Column 2, line 32, "0 = x < 2" to read -- $0 < x < 2$ --.

Column 6, line 9, "lasting" to read -- lasing --.

Column 6, line 44, "lasting" to read -- lasing --.

Signed and Sealed this

Seventeenth Day of May 1977

[SEAL]

Attest:

RUTH C. MASON
*Attesting Officer*

C. MARSHALL DANN
*Commissioner of Patents and Trademarks*